Jan. 31, 1933.  J. C. McCUNE  1,895,478
AIRPLANE BRAKE
Filed June 24, 1930

INVENTOR.
JOSEPH C. McCUNE
BY Wm. M. Cady
ATTORNEY.

Patented Jan. 31, 1933

1,895,478

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

AIRPLANE BRAKE

Application filed June 24, 1930. Serial No. 463,388.

This invention relates to fluid pressure brakes and more particularly to a brake valve device adapted to control the brakes of airplanes.

An object of the invention is to provide a self lapping brake valve device for airplanes.

Another object of the invention is to provide a brake valve device having a plurality of brake chamber controlling valve means adapted to be controlled by a single operating member.

Another object of the invention is to provide a brake valve device having a plurality of valve devices, each adapted to regulate the fluid pressure according to the degree of compression of a spring, in which a single operating member is provided for compressing the plurality of springs, and in which means are also provided for varying the action of the operating member upon each of the springs.

Another object of the invention is to provide an improved brake valve device of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

Figure 1:
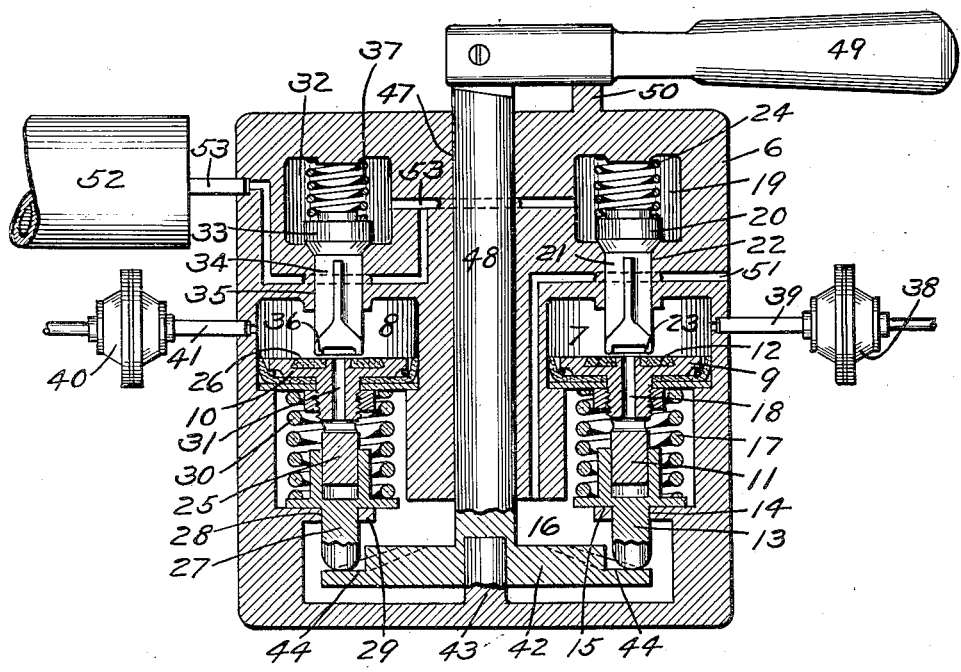
Figure 2:
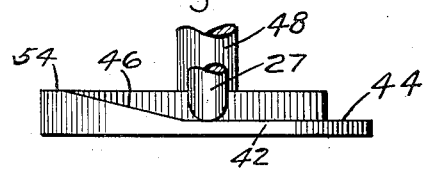
Figure 3:
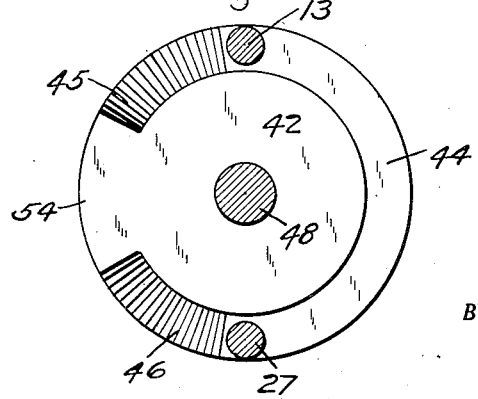

In the accompanying drawing; Figure 1 is a vertical longitudinal section of a brake valve device embodying the invention; Fig. 2 is a side view of the cam disc; and Fig. 3 is a plan of the structure shown in Fig. 2.

Referring to the drawing, the device may comprise a casing 6 having a pair of spaced apart piston chambers 7 and 8 containing valve pistons 9 and 10 respectively.

The valve piston 9 has a stem 11 projecting from one side thereof, while the side of said valve piston facing the chamber 7 is provided with a gasket or valve seat 12, the purpose of which will be hereinafter described. The stem 11 extends into a central bore of a flanged plunger 13 mounted in an opening 14 in a web 15 which projects into a chamber 16 from the side wall of the casing. Interposed between the flange of the plunger 13 and the piston valve 9, is a coil spring 17. An opening 18 is formed in the stem 11 and extends through the valve piston 9, inside the seat 12.

Contained in a chamber 19 is a fluid pressure supply valve 20 having a fluted stem 21 extending through a bore 22 formed in the casing between the chambers 7 and 19. In release position, the stem 21 terminates a slight distance from the inner face of the valve piston 9, said stem being provided with a seat rib 23 for engaging with the seat 12, for a purpose to be hereinafter more fully described. The supply valve 20 is normally held seated by a coil spring 24.

The valve piston 10 has a stem 25 projecting from one side thereof, while the side of said valve piston facing the chamber 8 is provided with a gasket or valve seat 26, the purpose of which will be hereinafter described. The stem 25 extends into a central bore of a flanged plunger 27 mounted in an opening 28 in a web 29 which projects into the chamber 16 from the wall of the casing on the side opposite to the web 15 heretofore referred to. Interposed between the flange of the plunger 27 and the valve piston 10 is a coil spring 30. An opening 31 is formed in the stem 25 and extends through the valve piston 10, inside the seat 26.

Contained in a chamber 32 is a fluid pressure supply valve 33 having a fluted stem 34 extending through a bore 35 formed in the casing between the chambers 8 and 32. In release position, the stem 34 terminates a slight distance from the inner face of the valve piston 10, said stem being provided with a seat rib 36 for engaging with the seat 26, for a purpose to be hereinafter more fully described. The supply valve 33 is normally held seated by a coil spring 37.

The valve chambers 19 and 32 are connected to a source of fluid under pressure, such as a main reservoir 52 by a pipe and passage 53.

Piston chamber 7 is connected to a brake chamber 38 by a pipe 39, and piston chamber 8 is connected to a brake chamber 40 by a pipe 41. The brake chambers 38 and 40 are adapted to control the brakes of the right hand and left hand wheels, respectively, of an airplane.

The valve pistons 9 and 10 are adapted to be individually operated and also collectively operated, and for this purpose, a single operating member is provided in the form of a disc 42 contained in chamber 16 and rotatably mounted on a stud 43 which projects into said chamber from the bottom of the casing.

The disc 42 is provided with an annular surface 44 which extends part way around the periphery of said disc and terminates at each end in upwardly inclined cam surfaces 45 and 46 respectively. The surfaces 44, 45 and 46 constitute a track for the depending ends of the plungers 13 and 27, and in order to reduce friction to a minimum, the tips of said plungers which bear on said surfaces are rounded.

Projecting upwardly from the disc 42, and extending through a bore 47 in the casing, is a shaft 48. The upper end of the shaft is pivotally connected to an operating handle 49.

The handle 49 is adapted to be turned in a horizontal path, as well as to be tilted downwardly with respect to the casing, and for this purpose the top of the casing is provided with an upstanding rib 50 on which the handle rests, said rib providing a fulcrum when the handle is tilted, as will be hereinafter more fully described.

In operation, when the handle 49 is in release position, the tips of the plungers 13 and 27 engage the lower track surface 44 of the cam disc 42, and the cam disc is in its lowermost position in the casing, in which position, the springs 17 and 30 are not under compression, so that valve pistons 9 and 10 are disposed in the bottoms of the chambers 7 and 8 respectively.

In release position, the brake chamber 38 is connected to the atmosphere, through pipe 39, chamber 7, opening 18, chamber 16, and atmospheric passage 51, and the brake chamber 40 is connected to the atmosphere, through pipe 41, chamber 8, opening 31, chamber 16, and atmospheric passage 51.

When the airplane is landing and is moving in a straight path, if it is desired to apply the brakes, the handle 49 is depressed, so as to raise the cam disc 42. The upward movement of the cam disc 42 causes a similar upward movement to be imparted to the plungers 13 and 27 and the springs 17 and 30 are compressed.

Since the springs 17 and 30 act on the valve pistons 9 and 10 respectively, said valve pistons will be moved upwardly. In the upward movement of the valve pistons 9 and 10, the seats 12 and 26 seal against the seat ribs 23 and 36 of the valves 20 and 33 respectively, thereby closing the communication through which the chambers 7 and 8 are respectively connected to the atmosphere. Continued upward movement of the valve pistons 9 and 10 then unseats the valves 20 and 33 respectively.

Fluid under pressure is then admitted to chambers 7 and 8 from the valve chambers 19 and 32, respectively, and from thence flows to the brake chambers 38 and 40, through pipes 39 and 41 respectively, to effect an application of the brakes of both wheels of the airplane.

When the pressure in chamber 7, acting on the valve piston 9, slightly exceeds the opposing pressure of the spring 17, the valve piston 9 will be moved downwardly, so as to permit the supply valve 20 to be seated by spring 24 and thus cut off the further supply of fluid under pressure to the brake chamber 38. Since the downward movement of the valve piston 9 will be slight, the seat rib 23 on the stem of the valve 20 will remain seated against the seat 12.

It will now be seen that both the supply and release ports controlled by the valve piston 9 will be closed or lapped, and the parts will remain in this position, as long as the pressure in the brake chamber 38 corresponds with the pressure to which the spring 17 is set.

Likewise, when the pressure in chamber 8, acting on the valve piston 10, slightly exceeds the opposing pressure of the spring 30, the valve piston 10 will be moved downwardly, so as to permit the supply valve 33 to be seated by spring 37 and thus cut off the further supply of fluid under pressure to the brake chamber 40. Since the downward movement of the valve piston 10 will be slight, the seat rib 36 on the stem of the supply valve 33 will remain seated against the seat 26.

It will now be seen that both the supply and release ports controlled by the valve piston 10 will be closed or lapped, and the ports will remain in this position, as long as pressure in the brake chamber 40 corresponds with the pressure to which the spring 30 is set.

While the brakes are applied, the brake chamber pressure may be increased by further depressing the handle 49, so as to further compress the spring 17 and 30, whereby the valve pistons 9 and 10 are again operated so as to again open the supply valves 20 and 33 respectively.

When the pressures in the brake chambers 38 and 40 and in chambers 7 and 8 respectively, has been increased to correspond with the increased pressures of springs 17 and 30, the valves 20 and 33 respectively will be again closed, in the manner hereinbefore described.

If leakage from either brake chamber should occur while the handle 49 is in a given brake applying position, the reduced pressure in chamber 7 or 8 acting on the respective valve piston will permit the spring 17 or 30 to operate the respective valve piston associated therewith, so as to open the supply valve and admit fluid to the brake chamber to compensate for the leakage.

When it is desired to release the brakes, the handle 49 is lifted upwardly, so that a reduction in the compression of springs 17 and 30 is effected. This reduction in spring pressure on valve pistons 9 and 10 permits the higher brake chamber pressure on the opposite sides of said valve pistons to move the valve pistons downwardly. In this action, supply valves 20 and 33 are first seated by their respective springs, and the valve piston seats 12 and 26 are then unseated from the seat ribs 23 and 36 respectively. Fluid under pressure will then be vented from the brake chambers and the piston chambers 7 and 8, to the atmosphere, through the passage 51, so as to effect the release of the brakes.

In case the airplane is moving in an arc when an application of the brakes is being effected, if so desired, only the brakes on one wheel can be applied, or if so desired the brakes on one wheel can be applied with greater force than the brakes on the other wheel.

Should it be desired to apply only the brakes on one wheel, for instance the brakes associated with the brake chamber 38, the handle 49 is turned in a clockwise direction. This action moves the inclined surface 45 of the disc 42 beneath the plunger 13. The plunger 13 rides up the inclined surface 45, thereby compressing the spring 17. With the spring 17 thus compressed, the valve piston 9 will be operated in the manner heretofore described to unseat the supply valve 20, so that fluid under pressure is supplied to the brake chamber 38. During this operation the plunger 27 will remain on the lower annular surface 44 of the cam disc 42 and therefore valve piston 10 will be inactive.

However, after the handle 49 has been turned in a clockwise direction, the desired amount to effect the application of the brakes associated with the brake chamber 38, should it be desired to also apply the brake of the other wheel, the handle 49 can be depressed so as to raise the cam disc 42, so that the spring 30 will also be compressed.

In this way both valve pistons will be operated to supply fluid under pressure to both brake chambers, but the amount of fluid under pressure supplied to the brake chamber 38 will be greater than the amount of fluid under pressure supplied to the brake chamber 40, since the spring 17 will be compressed more than the spring 30 is compressed.

On the other hand, should it be desired to provide a greater pressure in the brake chamber 40 than that in the brake chamber 38, the handle 49 is turned in a counter clockwise direction and then depressed, so as to compress the spring 30 a greater amount than the spring 17 is compressed.

It will also be understood that the differential of pressure thus obtained in either brake chamber is proportional to the amount the handle 49 is turned in either direction and then depressed, the maximum pressure being obtained when the handle is turned in either direction an amount sufficient to bring either plunger on to the upper flat surface 54 of the cam disc 42 and then depressed the full amount.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with two brake chambers, of valve means operable to supply fluid under pressure to one brake chamber, separate valve means operable to supply fluid under pressure to the other brake chamber, and a rotatable and axially movable element for operating both vlave means upon axial movement, and one of said valve means upon rotary movement.

2. In a fluid pressure brake, the combination with two brake chambers, of valve means operable to supply fluid under pressure to one brake chamber, separate valve means operable to supply fluid under pressure to the other brake chamber, and a rotatable and axially movable element for operating both valve means upon axial movement, one of said valve means upon rotation of said element in one direction, and the other of said valve means upon rotation of said element in the opposite direction.

In testimony whereof I have hereunto set my hand, this 20th day of June, 1930.

JOSEPH C. McCUNE.